(12) United States Patent
Szakaly

(10) Patent No.: US 6,527,002 B1
(45) Date of Patent: Mar. 4, 2003

(54) APPARATUS AND METHOD FOR USE WITH A CONTAINER FOR STORING A SUBSTANCE

(76) Inventor: Istvan Szakaly, 34 Meldrum Way, Koondoola, 6064 (AU)

( * ) Notice: Subject to any disclaimer, the term of this patent is extended or adjusted under 35 U.S.C. 154(b) by 0 days.

(21) Appl. No.: 09/646,333

(22) PCT Filed: Mar. 16, 1999

(86) PCT No.: PCT/AU99/00169

§ 371 (c)(1),
(2), (4) Date: Nov. 15, 2000

(87) PCT Pub. No.: WO99/47434

PCT Pub. Date: Sep. 23, 1999

(30) Foreign Application Priority Data

Mar. 16, 1998 (HU) .............................................. 9800578

(51) Int. Cl.$^7$ .............................................. G05D 16/00
(52) U.S. Cl. .................... 137/14; 220/88.1; 220/567.2; 220/723
(58) Field of Search .................. 220/720, 721, 220/723, 567.2, 88.1; 137/14

(56) References Cited

U.S. PATENT DOCUMENTS

| | | | | |
|---|---|---|---|---|
| 1,690,072 A | * | 10/1928 | Johnson | 220/721 |
| 2,179,682 A | * | 11/1939 | Booth | 220/723 |
| 2,609,118 A | * | 9/1952 | Cattaneo | 220/723 |
| 2,758,747 A | * | 8/1956 | Stevens | 220/723 X |
| 2,798,639 A | * | 7/1957 | Urban | 220/567.2 |
| 3,747,800 A | * | 7/1973 | Viland | 220/723 |
| 3,752,355 A | * | 8/1973 | Weissenbach | 220/86.1 |
| 4,254,887 A | * | 3/1981 | Bold | 220/723 |
| 5,154,308 A | | 10/1992 | Larson | |
| 5,217,138 A | | 6/1993 | Nichols | |
| 5,979,481 A | * | 11/1999 | Ayresman | 220/721 X |

FOREIGN PATENT DOCUMENTS

| | | |
|---|---|---|
| DE | 30 11 894 | 10/1980 |
| EP | 0 521 302 | 1/1993 |
| EP | 0 570 721 | 11/1993 |
| FR | 2 624 521 | 6/1989 |
| HU | P9503523 | 11/1996 |
| HU | P9503950 | 8/1997 |
| WO | WO 84/04515 | 11/1984 |
| WO | WO 85/01035 | 3/1985 |

* cited by examiner

Primary Examiner—John Rivell
(74) Attorney, Agent, or Firm—Rothwell, Figg, Ernst & Manbeck

(57) ABSTRACT

An apparatus (1) for use with a container (100) for storing a substance. Typically, the substance is a volatile liquid, such as hydrocarbon fuels, alcohol or distilled liquids. The apparatus (1) acts to prevent filling and evaporative losses of the liquid, minimise internal corrosion of the container (100) and prevent humidification of the liquid. The apparatus (1) employs a bladder (3a, 3b) inside the container (100). The bladder (3a, 3b) is filled with air. A pressure control unit (7) is provided to control the supply of air to the bladder (3a, 3b) such that the pressure in the bladder (3a, 3b) is maintained at or above a selected level, being the vapour pressure inside the container (100). The bladder (3a, 3b) is maintained in an inflated condition such that it fills the space above the substance in the container (100).

35 Claims, 13 Drawing Sheets

APPARATUS AND METHOD FOR USE WITH A CONTAINER FOR STORING A SUBSTANCE

FIELD OF THE INVENTION

The present invention relates to an apparatus and method for use with a container for storing a substance, and in particular, where the substance stored is subject to evaporative losses or where the container is susceptible to corrosion.

Examples of evaporative substances which may be typically stored in such containers include hydrocarbon fuels (such as petrol), lubricating oil, distilled liquids, alcohol and sewerage.

Such liquids are, for example, generally stored in containers such as above ground and below ground fuel tanks, fuel tanks for vehicles (including land craft, aircraft and marine craft), fuel reservoir tanks, oil storage tanks, and wine fermenting vats and sewerage storage tanks.

Volatile liquids, such as fuels, are subject to evaporative losses when stored in storage tanks. Tanks storing such liquids are also subject to internal corrosion as are storage tanks storing lubricating oil. Moisture entering such storage tanks results in emulsion of the lubricating oil.

Evaporation of liquid stored in containers have several disadvantageous effects. Firstly, it results in filling and evaporative losses of the stored liquid. It may also result in internal corrosion of the container. Furthermore, contamination of the stored liquid may occur along with increased humidity levels in the container. Where the liquid is a flammable liquid, the evaporative effect may also increase fire hazards. Escape of the vapor may also present an environmental risk where the liquid is toxic or hazardous, as in the case of storage of fuels and sewerage.

Filling losses occur when the container is filled or refilled with liquid. For example, when the stored liquid is fuel, during the filling process, the liquid entering the container pushes out the existing fuel vapors which are then lost to the ambient atmosphere outside the container. In the case of a flammable liquid, there is a risk that the vapor will ignite resulting in an explosion.

Evaporation of the stored liquid also results in breathing losses. These occur when the stored liquid is heating up or cooling down. In the heating up process, the liquid expands and its volume increases. This results in the liquid vapor above the liquid in the container being pushed out of the container into the atmosphere. In the cooling down process, the liquid contracts and its volume decreases. This results in air being drawn into the container from the atmosphere. When liquid is discharged from the container, air is again drawn into the container and condensed vapor will settle on the walls of the container. This causes corrosion and the oxygen in the air in the container will oxidise the stored liquid.

BACKGROUND ART

Several prior art systems have sought to address the problems identified above.

One previous system provides a breathing valve for the container which merely delays the in or out breathing of the liquid in the container.

To overcome filling losses, a vapor return is used. Thus, when the container is filled with liquid, the increased pressure which occurs in the container pushes the vapor back to the reservoir from which the container is being filled. In the case where the container being filled is a petrol storage tank which is being filled by a tanker truck, the vapor is pushed back into the tanker truck reservoir. However, this system addresses losses which occur only in connection with the filling procedure. When liquid is discharged from the container, air is still drawn into the container from the atmosphere to take up the volume of liquid discharged. This incoming air results in corrosion inside the container.

Another system is known from U.S. Pat. No. 3,747,800. In this system, the container is provided with an inner tank constructed of a flexible material. The liquid is contained within the inner tank. The inner tank expands and contracts in accordance with the volume of liquid contained therein.

A further system is disclosed in WO 85/01035 (International Patent Application PCTIHU84/00044). The system disclosed in this specification uses a sheet element provided above the volatile substances stored in a storage tank.

SUMMARY OF THE INVENTION

In accordance with one aspect of the present invention there is provided an apparatus for use with a container for storing a substance comprising:

bladder means arranged to be located in the container and above the substance stored therein, pipe means to deliver inflation medium to said bladder means, pressure control means to supply inflation medium to said bladder means via said pipe means, first pressure relief means to allow escape of inflation medium from said bladder means to relieve pressure from said bladder means, said first pressure relief means is set to a first selected pressure that is higher than the vapor pressure of the substance in the container, and second pressure relief means to allow escape of vapor of the substance from the container to relieve pressure from the container, said second pressure relief means is set to a second selected pressure that is higher than said first selected pressure, wherein said pressure control means is arranged to control supply of inflation medium to said bladder means to maintain the pressure in said bladder means above the vapor pressure of the substance in the container and said bladder means substantially fills the space above the substance in the container, said first pressure relief means is arranged to relieve pressure build-up in said bladder means to maintain the pressure in said bladder means at or below said first selected pressure, and said second pressure relief means is arranged to relieve pressure build-up in the container to maintain the pressure in the container at or below said second selected pressure.

Preferably, the apparatus further comprises means to selectively close off the container from said second pressure relief means to prevent escape of vapor of the substance from the container via said second pressure relief means and thereby prevent pressure relief from the container via said second pressure relief means when required.

Preferably, the apparatus further comprises means to selectively close off said bladder means from said first pressure relief means to prevent escape of inflation medium from said bladder means via said first pressure relief means and thereby prevent pressure relief from said bladder means via said first pressure relief means when required.

Preferably, said first selected pressure is up to substantially 5% higher than the vapor pressure of the substance in the container such that the pressure in said bladder means is maintained at a level up to substantially 5% higher than the vapor pressure of the substance in the container.

Preferably, said second selected pressure is up to substantially 20% higher than the vapor pressure of the substance in the container.

Preferably, the volume of said bladder means when inflated is substantially the same as the volume of the container.

Preferably, the substance in the container comprises a liquid.

Preferably, said means to selectively close off the container from said second pressure relief means comprises a first isolation valve.

Preferably, said means to selectively close off said bladder means from said first pressure relief means comprises a second isolation valve.

Preferably, said sensor means comprises a pressure gage.

Preferably, said sensor means comprises a temperature gage.

Preferably, access means is provided to access the interior of said bladder means.

Preferably, inlet means is provided to enable said container to be purged of air with a gas during installation of said bladder means into said container.

Preferably, the volume of said bladder means when inflated is substantially the same as the space remaining in said container when said container is filled with liquid.

Preferably, a cover is provided to close off an opening of said container, said cover provided with fittings to which said bladder means is attachable.

Preferably, said cover is provided with shroud means extending therefrom and arranged to be positioned within said container, said shroud means housing equipment located in said container.

Preferably, said shroud means is provided with vent openings in an upper region thereof.

Preferably, said shroud means comprises a tube attached at one of its ends to said cover.

Preferably, said bladder means comprises one or more individual bladders.

Preferably, the inflation medium comprises gas.

More preferably, the inflation medium comprises air.

Alternatively, the inflation medium comprises liquid.

As a further alternative, the inflation medium comprises a combination of gas (for example, air) and liquid.

In accordance with a second aspect of the present invention there is provided
  a method for use with a container for storing a substance comprising
    installing bladder means into the container,
    delivering inflation medium to said bladder means,
    controlling the supply of the inflation medium to said bladder means to maintain the pressure in said bladder means above the vapor pressure of the substance in the container, allowing escape of inflation medium from said bladder means to relieve pressure build-up in said bladder means to maintain the pressure in said bladder means at or below a first selected pressure, said first selected pressure being higher than the vapor pressure of the substance in the container,
    allowing escape of vapor of the substance stored in the container to relieve pressure build-up in the container to maintain the pressure in the container at or below a second selected pressure, said second selected pressure being higher than said first selected pressure, and maintaining said bladder means in an inflated condition to substantially fill the space above the substance in the container.

Preferably, said first selected pressure is up to substantially 5% higher than the vapor pressure of the substance in the container and the method further comprises maintaining the pressure in said bladder means at a level up to substantially 5% higher than the vapor pressure of the substance in the container.

Preferably, said second selected pressure is up to substantially 20% higher than the vapor pressure of the substance in the container.

Preferably, the substance in the container comprises a liquid.

Preferably, the inflation medium comprises gas.

More preferably, the inflation medium comprises air.

Alternatively, the inflation medium comprises liquid.

As a further alternative, the inflation medium comprises a combination of gas (for example, air) and liquid.

The apparatus and method of the present invention act to reduce evaporative losses and/or reduce the internal corrosion of the container, depending on the nature of the substance being stored.

The apparatus and method of the present invention achieve this by preventing formation of vapor from the liquid in the container and by preventing ingress of air into the container.

At the same time, the apparatus and method of the present invention prevent humidification of the container, reduce fire risks by preventing escape of possibly flammable vapors which could ignite, and preventing escape of environmentally damaging or undesirable vapors. This latter problem may otherwise, for example, occur where the substance being stored is toxic or sewerage.

The apparatus and method of the present invention employ pressurisation of a bladder inside the container storing the substance, typically a liquid.

BRIEF DESCRIPTION OF THE DRAWINGS

The present invention will now be described, by way of example, with reference to the accompanying drawings, in which.

BEST MODE(S) FOR CARRYING OUT THE INVENTION

Figure 1:
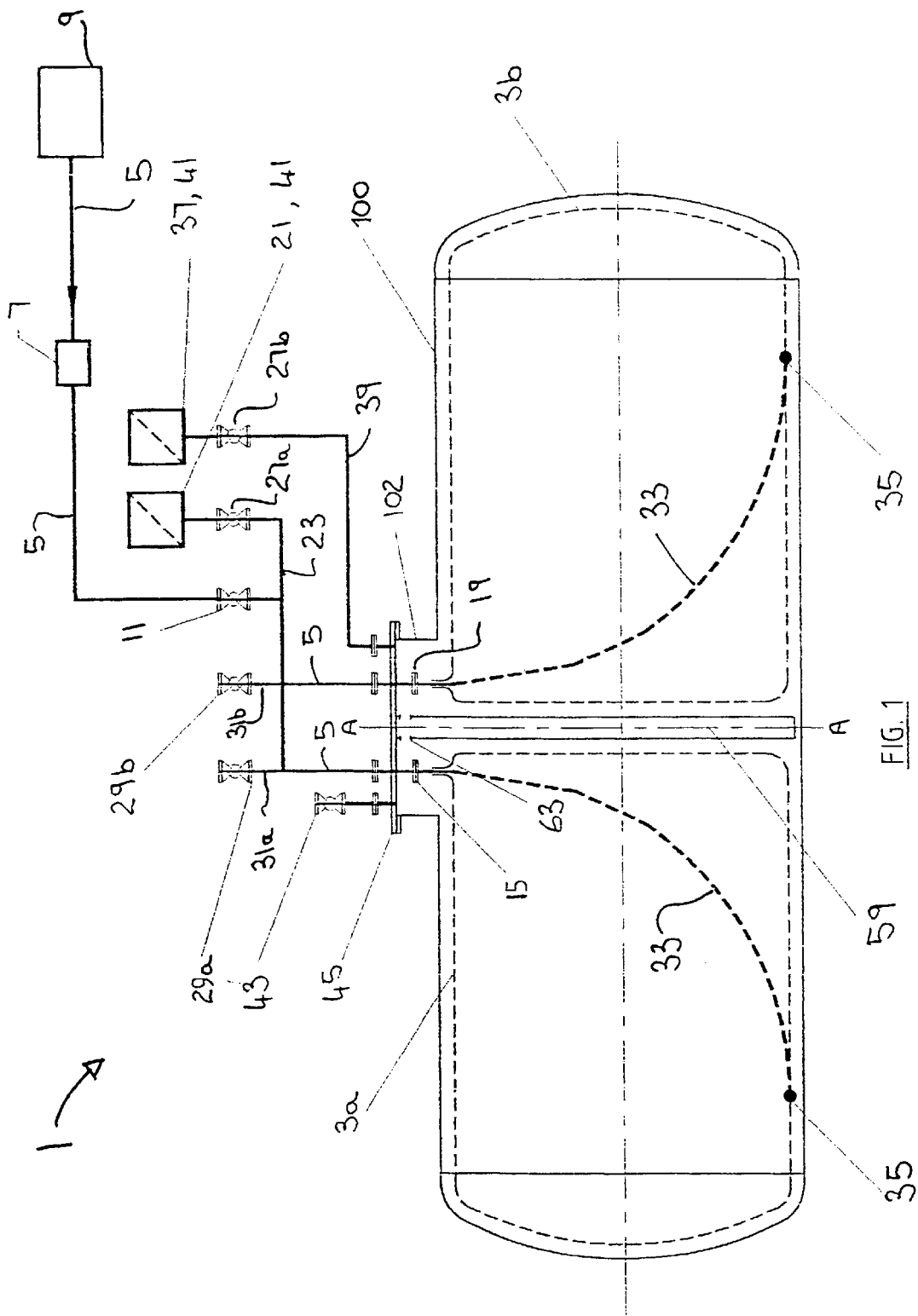
FIG. 1 is a vertical cross-section view showing a first embodiment of the apparatus in accordance with an aspect of the present invention in use with a below ground horizontal cylindrical tank having a single manhole.
Figure 2:
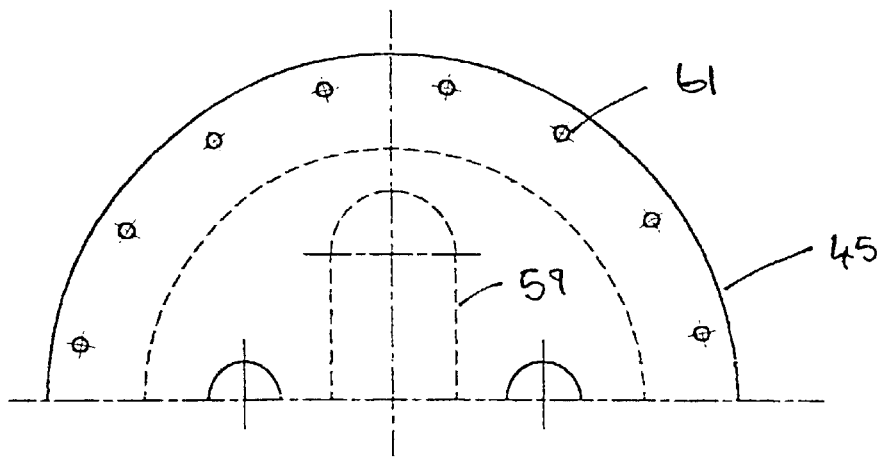
FIG. 2 is a half plan view of the manhole cover of the apparatus shown in FIG. 1.

In FIG. 1, there is shown an apparatus 1 for use with a container 100 for storing a substance. Typically, the substance stored in the container 100 will be a volatile liquid, such as petrol, light hydrocarbons, distilled liquids, or alcohol.

The apparatus 1 comprises first and second bladders 3a and 3b, a pipe network 5 to deliver an inflation medium to the bladders 3a and 3b and a pressure control unit 7 to control the inflation pressure of the bladders 3a and 3b.

Any suitable inflation medium may be used. Generally, the most readily available inflation medium will be air and the following description of the invention will be with reference to the inflation medium being air. However, it is to be understood that other suitable inflation mediums, as apparent to the skilled addressee, may also be used.

Compressed air is supplied from a compressed air source, such as a compressor 9, via the pipe network 5. The pipe network 5 contains the pressure control unit 7. A control nozzle 11 is provided downstream of the pressure control unit 7 to control supply of air to the bladders 3a and 3b. The control nozzle 11 acts as a safety valve and can be moved between an open condition and a closed condition. In the open condition, air is able to pass through the control nozzle 11 to the bladders 3a and 3b. In the closed condition of the control nozzle 11, air is unable to pass therethrough to the bladders 3a and 3b. Normally, the control nozzle 11 is in the open condition during operation of the apparatus 1. The closed condition of the nozzle 11 is used during maintenance of the apparatus 1 and the container 100.

Each bladder 3a and 3b is connected to a respective pipe 18a, 18b of the pipe network 5. The bladders 3a and 3b may be connected to the pipe networks in any suitable manner.

Figure 3:
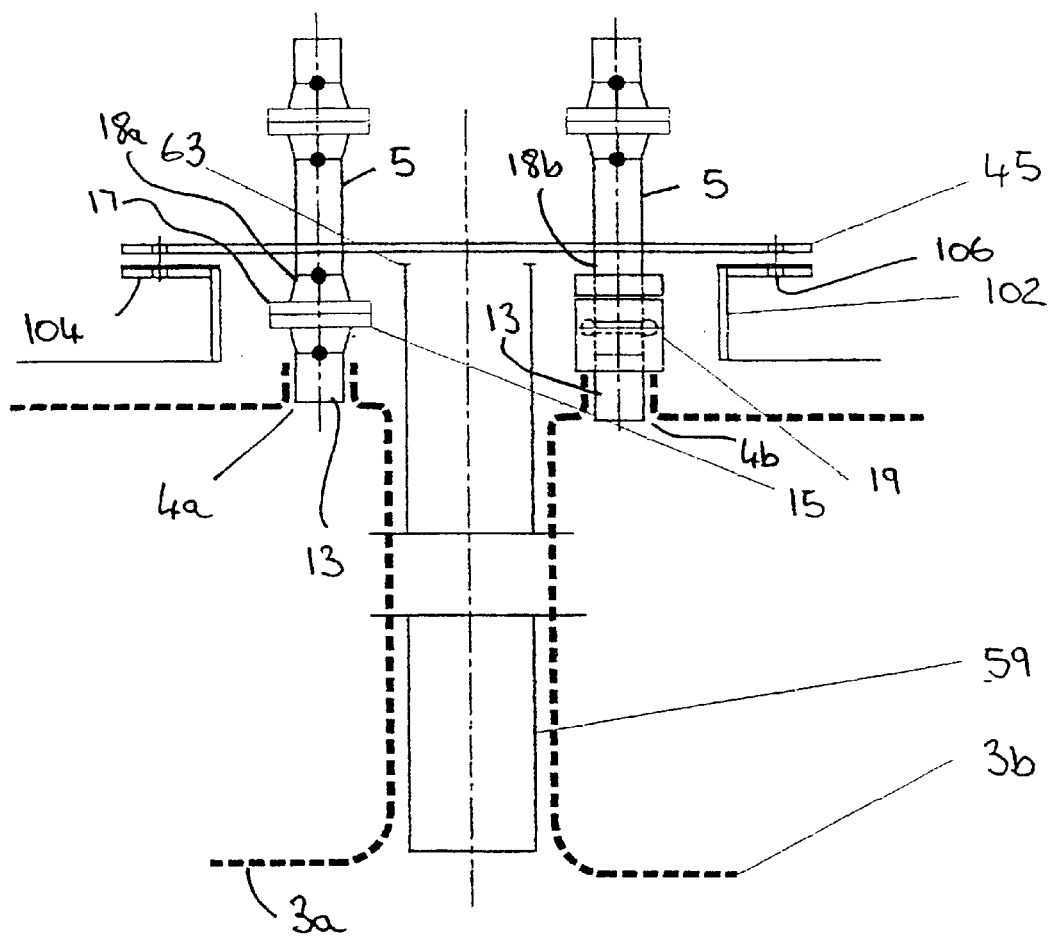
FIG. 3 is a detailed cross-sectional view showing two alternative attachments of the bladders to the fittings in the manhole cover.

In FIG. 3, the bladders 3a and 3b are connected to the pipe network 5 via a different arrangements.

In each arrangement, the respective bladders 3a and 3b are securely fastened to a short pipe 13.

The short pipe 13 to which the bladder 3a is attached is connected to the pipe network 5 by way of a flange 15 which is bolted to a flange 17 of pipe 18a of the pipe network 5.

The short pipe 13 to which the bladder 3b is attached is connected to the pipe 18b of the pipe network 5 by a locking device 19, such as a Minsup joint.

The bladders 3a and 3b are made from material which is resistant to the substance stored in the container 100. The bladders 3a and 3b are made from a material which is flexible to enable the bladders 3a and 3b to be inflated.

The material of the bladders 3a and 3b may be weldable.

The material of the bladders 3a and 3b may be reinforced antistatic fibre or plastics. However, any other suitable material may be used.

The apparatus 1 is provided with a pressure relief valve 21 for the bladders 3a and 3b. The pressure relief valve 21 is connected to the pipe network 5 by a pipe 23.

An isolation valve 27a is provided in the pipe 23. The isolation valve 27a enables the bladders 3a and 3b to be closed off from the pressure relief valve 21 if required, e.g. during charging of the container 100 with liquid.

The apparatus 1 is also provided with vent nozzles 29a and 29b for the bladder 3a and 3b, respectively. The vent nozzles 29a and 29b incorporate ball valves. The vent nozzles 29a and 29b are connected into the pipe network 5 via pipes 31a and 31b.

The vent nozzles 29a and 29b are closed during operation of the apparatus 1. However, during maintenance periods, the ball valves incorporated in the vent nozzles 29a and 29b may be opened. This allows a flexible suction pipe 33 to be inserted down through the pipes 31a and 31b, the pipe network 5 and the short pipes 13 into the bladders 3a and 3b. This is shown in FIG. 1. The flexible suction pipes 33 terminate in suction heads 35. During maintenance, any condensed vapors which have settled in the bottom of the bladders 3a and 3b may be sucked out by the suction heads 35 and back up the flexible suction pipes 33.

The apparatus 1 is also provided with a pressure relief valve 37 for the container 100. The pressure relief valve 37 allows vapor to be vented from the container if required. The pressure relief valve 37 is connected to the tank 100 via a pipe 39. An isolation valve 27b is provided in the pipe 39. The isolation valve 27b enables the container 100 to be closed off from the pressure relief valve 37 if required, e.g. during charging of the container 100 with liquid.

In the case of the container 100 storing a flammable liquid, such as petrol, fire arrestors 41 are incorporated into the pressure relief valves 21 and 37.

An inert gas inlet nozzle 43 is connected to the container 100. The inert gas inlet nozzle 43 incorporates a ball valve so that the inert gas inlet nozzle 43 is normally closed. However, it is used during charging of the container 100 with the substance to be stored therein as will be later herein described.

The apparatus 1 also provides a cover 45 to cover the manhole 102. The pipes 18a and 18b are carried by the cover 45.

The cover 45 also accommodates the openings into the container 100 of the pipe 39 and the pipe leading from the inert gas inlet nozzle 43.

The cover 45 may also accommodate the nozzle fittings, openings and ports for other pipes and instruments that are required to be inserted into the container 100 as described below.

The cover 45 is provided with nozzles, openings and ports to accommodate the filling pipe 47 for charging the container 100 with the substance to be stored therein, a measuring device and sampling nozzle 49 to check the volume of the substance remaining in the container 100 and take samples therefrom, a sump suction nozzle 51, a suction nozzle 53 and a nozzle or port 55 for insertion of an instrument to check the volume of the liquid remaining in the container 100.

The filling pipe 47 is used to charge the container 100 with the liquid that is to be stored therein.

The measuring device 49 may be a calibrated bar which is used to check the volume of the liquid remaining in the container 100.

The sump suction nozzle 51 is used to extract water and other contaminants from the bottom of the container 100.

The suction nozzle 53 is provided to withdraw the stored liquid from the container 100.

The port 55 allows a level indicating instrument to be inserted into the container to check the volume of the liquid remaining in the container 100. Use of such a level indicating instrument avoids the need to insert an elongate bar, such as 49, to indicate the volume of the liquid in the tank 100.

Figure 4:
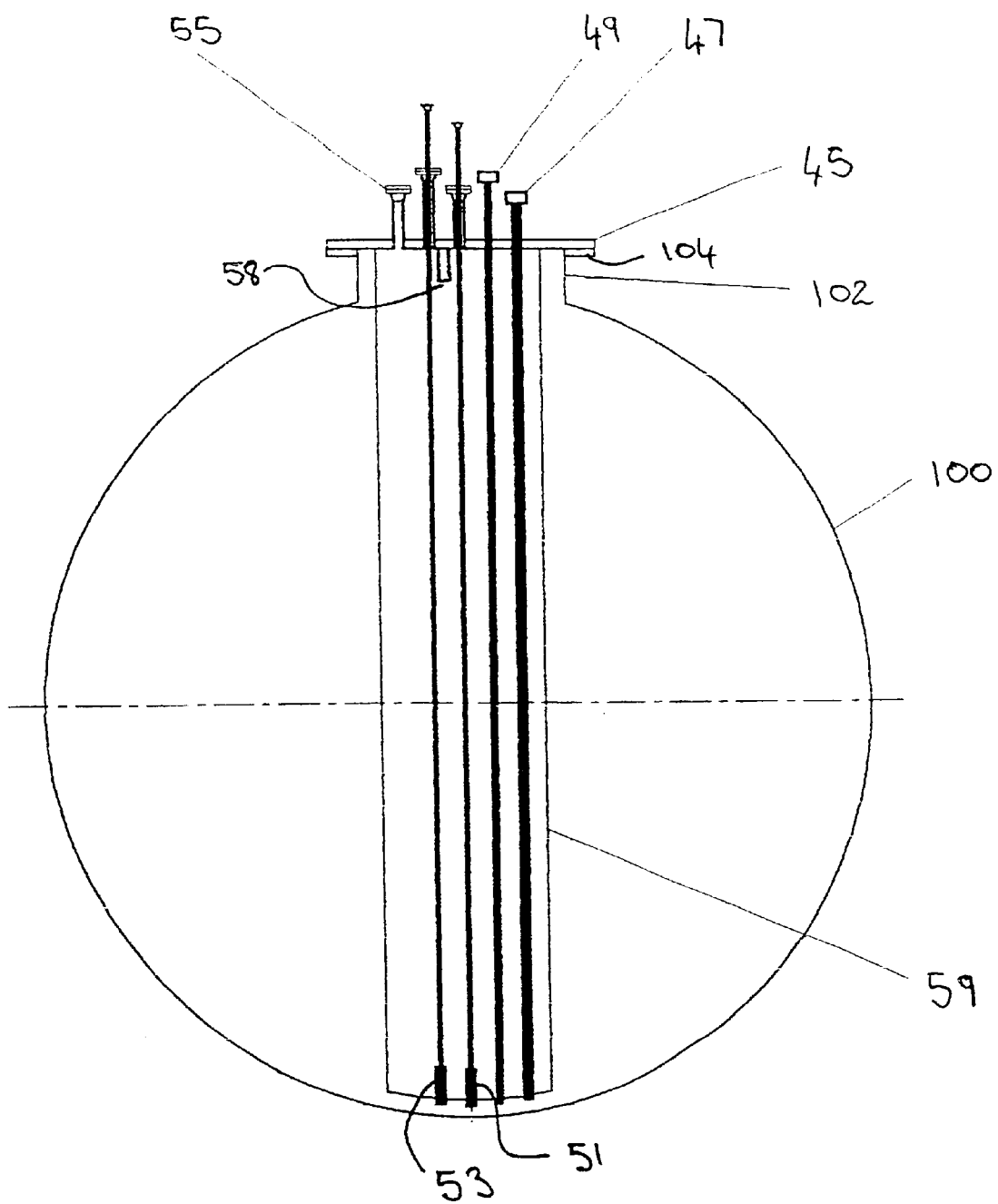
FIG. 4 is a cross-sectional view along the line A—A in FIG. 1.
Figure 5:
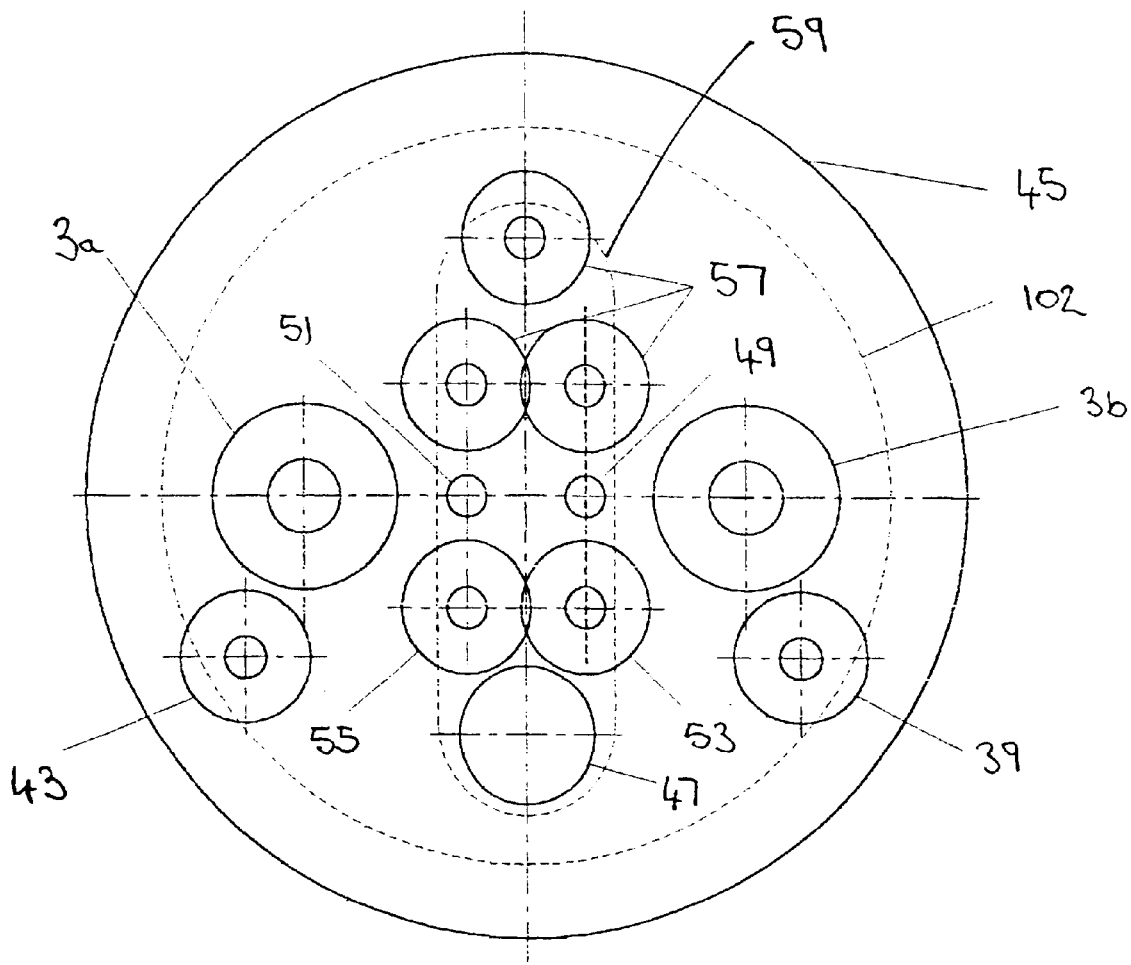
FIG. 5 is a plan view of the manhole cover of the apparatus shown in FIG. 1.

The arrangement of the nozzle fittings, openings and ports in the cover 45 to accommodate the instruments shown in FIG. 4 is shown in FIG. 5.

A sensor 58 is provided in the container 100 to measure the pressure and preferably also the temperature of the vapor in the container 100, and an indicator gauge (not shown) is provided externally of the container 100.

A sensor 58 may be provided at any suitable location/s in the container 100. For example, a sensor 58 may be mounted on the top surface of the cover 45, inside the shroud 59.

Extending from the inner face of the cover 45 is a shroud 59 having a plan view as shown by the dotted line 59 in FIG. 5. The shroud 59 is a metal plate tube which surrounds the instruments that are inserted through the nozzles, openings and ports in the cover 45 as described with reference to FIG. 4.

The arrangement of the cover 45 and the provision of the shroud 59 conveniently groups all of the instruments in a single location. In addition, the shroud 59 ensures that the bladders 3*a* and 3*b* do not come into contact with any of the instruments and technology piping that are inserted into the container 100. This prevents damage to the bladders 3*a* and 3*b* by avoiding contact with any of these instruments. The smooth surface of the shroud 59 protects the bladders 3*a* and 3*b* located on either side of the shroud 59.

The cover 45 may be attached to a flange 104 at the top of the manhole 102 by way of bolts (not shown) passing through openings 61 in the cover 45 and openings 106 in the flange 104.

The cover 45 may also be provided with reserve nozzles and ports 57 for use with other instruments and devices which may need to be inserted into the container 100.

Vent openings 63 are provided at the upper part of the shroud 59. The vent openings 63 allow air to vent from the shroud 59 when it starts to fill with liquid.

The manner of use and operation of the apparatus 1 will now be described.

The bladders 3*a* and 3*b* may be installed into the container 100 via the manhole 102. The bladder openings 4*a* and 4*b* are then attached to the respective pipe 13, as previously described with reference to FIG. 3. The cover 45 is then attached to the flange 104.

The shroud 59 is located between the bladders 3*a* and 3*b*.

The bladders 3*a* and 3*b* are then inflated to about 80% capacity with air via the pipe network 5. After this, an inert gas is injected into the container 100 via the inert gas inlet nozzle 43. The inert gas is injected into the container 100 to dispel the air from within the container 100. This air is able to escape from the container 100 via the pipe 39, through the isolation valve 27*b* and out through the pressure relief valve 37. Once the air has been expelled from the container 100, the bladders 3*a* and 3*b* are inflated to full capacity. In this state, they fill substantially the entire volume of the container 100, except for the space enclosed by the shroud 59. Inflation of the bladders 3*a* and 3*b* to their full capacity expels the inert gas from the space between the bladder and the inside wall of the container.

The container 100 may then be charged with the liquid that will be stored in the container 100. However, prior to doing this, the isolation valve 27*b* is closed. This will prevent escape of any vapor of the liquid during the charging process. The container 100 is charged with liquid via the filling pipe 47. As the container 100 is charged with liquid, the incoming liquid forces air out of the bladders 3*a* and 3*b*. This air exits via the pipe 23 and out through the pressure relief valve 21.

The pressure relief valve 21 is set at a pressure higher than the vapor pressure of the liquid in the container 100.

The pressure may be set at or higher than the required pressure in the bladders 3*a* and 3*b*.

Preferably, the pressure may be set at up to substantially 20% higher than the vapor pressure of the liquid, though more preferably at up to substantially 5% higher than the vapor pressure of the liquid.

Once the container 100 has been charged with the required amount of liquid, the filling pipe 47 is closed off. The isolation valve 27*b* is opened and acts as a safety valve. Thus, in the event that the bladders 3*a* and 3*b* malfunction, any built-up vapor pressure in the container 100 will be able to escape via the pipe 39 and out through the pressure relief valve 37.

During normal operation, the pressure control unit 7 ensures that the required air supply is provided to the bladders 3*a* and 3*b* to maintain the required pressure in the bladders 3*a* and 3*b*. The pressure in the bladders 3*a* and 3*b* is maintained at a pressure greater than the vapor pressure of the liquid inside the container 100. Preferably, the inflation pressure of the bladders 3*a* and 3*b* may be set at up to substantially 20%, though more preferably at up to substantially 5%, higher than the vapor pressure of the liquid in the container 100. Should more inflation pressure be required in the bladders 3*a* and 3*b* to maintain the pressures therein at the required level above the vapor pressure of the liquid, then the pressure control unit 7 allows additional air to be supplied to the bladders 3*a* and 3*b* via the pipe network 5.

Should the pressure in the container 100 be such that no further inflation of the bladders 3*a* and 3*b* is required, then the pressure control unit 7 prevents further supply of air to the bladders 3*a* and 3*b*.

The sensor 58 measures the pressure, and preferably the temperature, of the vapor of the liquid in the container 100.

Figure 14:
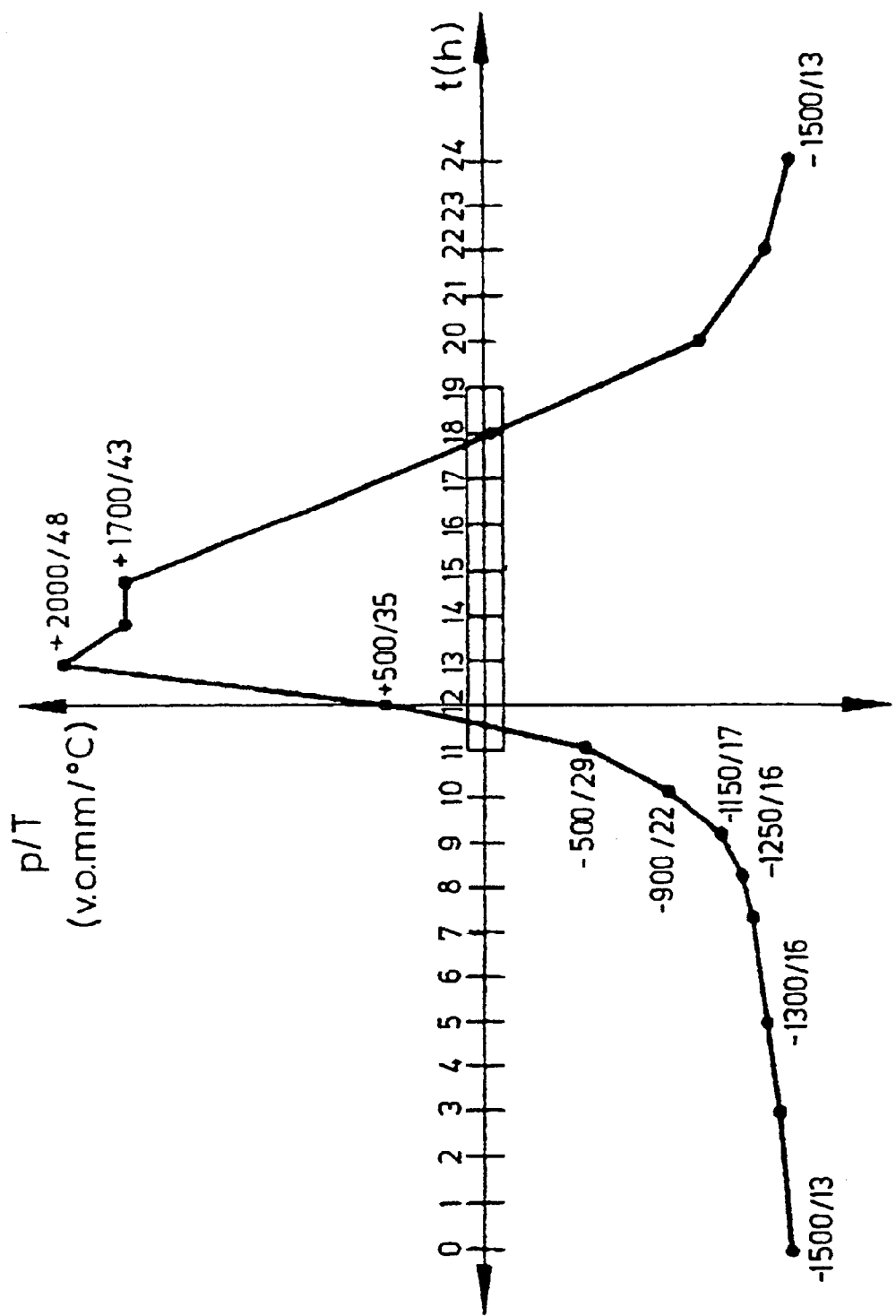
FIG. 14 is a graphical representation of the changes in vapor pressure and temperature of petrol over a 24 hour period.

FIG. 14 is an example of how the pressure and temperature of petrol may vary over a 24 hour period. Whilst this data depends upon a number of different parameters, such as the volume of the petrol and the ambient temperature, it does, nevertheless, show that the temperature and pressure are subject to increase during periods of greater ambient temperature which occur during the day. In contrast, at night, the temperature and pressure fall.

The pressure control unit 7 ensures that the inflation pressure of the bladders 3*a* and 3*b* is always at the required level above the vapor pressure of the liquid in the container 100. If the inflation pressure of the bladders 3*a* and 3*b* increases to compensate for increasing vapor pressure of the liquid in the container 100 (which, for example, may occur during daylight hours) this increased pressure should not adversely affect the container 100 nor the liquid stored in the container 100 when the vapor pressure of the liquid falls (which, for example, may occur at night). In any case, the pressure relief valve 21 may be set to a required pressure setting, as previously described herein. In this way, should significantly high pressures occur in the bladders 3a and 3b, air is able to discharge through the pressure relief valve 21.

In normal operation, liquid is discharged from the container 100 via the suction nozzle 53. For example, when the container 100 is a petrol tank, the suction nozzle 53 draws the petrol from the container 100 and distributes it to pumps which are used for filling the fuel tanks of motor vehicles.

As liquid is drawn from the container 100 via the suction nozzle 53, the volume of the liquid in the container 100 decreases. As this occurs, the pressure control unit 7 allows additional air to be supplied to the bladders 3a and 3b via the pipe network 5 to maintain the required pressure in the bladders 3a and 3b. The bladders 3a and 3b also inflate in size so that they continue to occupy all of the space above the liquid in the container 100 as liquid is discharged from the container 100.

When the container 100 needs to be recharged with liquid, a similar procedure is followed as previously described herein for first charging the container 100 with liquid. However, when the container 100 is subsequently charged with liquid, it is not necessary to inject inert gas via the inert gas inlet nozzle 43.

Air is run out from the pressure relief valve 21 because the pressure relief valve 37 is set at a higher pressure, for example 20% higher than the vapor pressure of the liquid, than the pressure relief valve 21.

Due to the inflated condition of the bladders 3a and 3b as previously described herein, evaporative losses as the liquid in the container 100 breathes in and out is substantially reduced. This means that there are no vapors that are able to escape from the container 100. In addition, during the inbreathing of the liquid, air is not drawn into the container 100. Thus, there is no moisture bearing air drawn into the container 100 from the outside.

Loss of vapors to the outside air is significantly reduced and the environment is not polluted with such vapors, toxic or damaging to the environment. Since air is not drawn into the container 100 during inbreathing of the liquid, corrosion of the interior of the container 100 is also significantly reduced.

The apparatus 1 of the present invention also enables for easy maintenance of the bladders 3a and 3b and the container 100. Such maintenance may be carried out when the container 100 is empty of liquid.

During maintenance, the flexible suction pipe 19 may be inserted into the bladders 3a and 3b via the vent nozzles 31a and 31b which allow access into the bladders 3a and 3b as previously described herein. Any condensed vapor that has settled in the bottom of the bladders 3a and 3b may be drawn out by the suction heads 35.

Access to the inside of the container 100 is possible by removing the cover 45 and removing the bladders 3a and 3b from the container 100. This enables free access to the interior of the container 100 for cleaning and inspection thereof.

The sump suction nozzle 51 may also be used during maintenance periods in the manner previously described herein.

FIGS. 6–13 illustrate alternative embodiments and applications of the apparatus of the present invention. The following description of FIGS. 6–13 will primarily be concerned with the differences between apparatus 1 shown in FIGS. 1–5 and the embodiments and arrangements shown in FIGS. 6–13. Similar reference numerals are used in all the drawings for similar parts.

Figure 6:
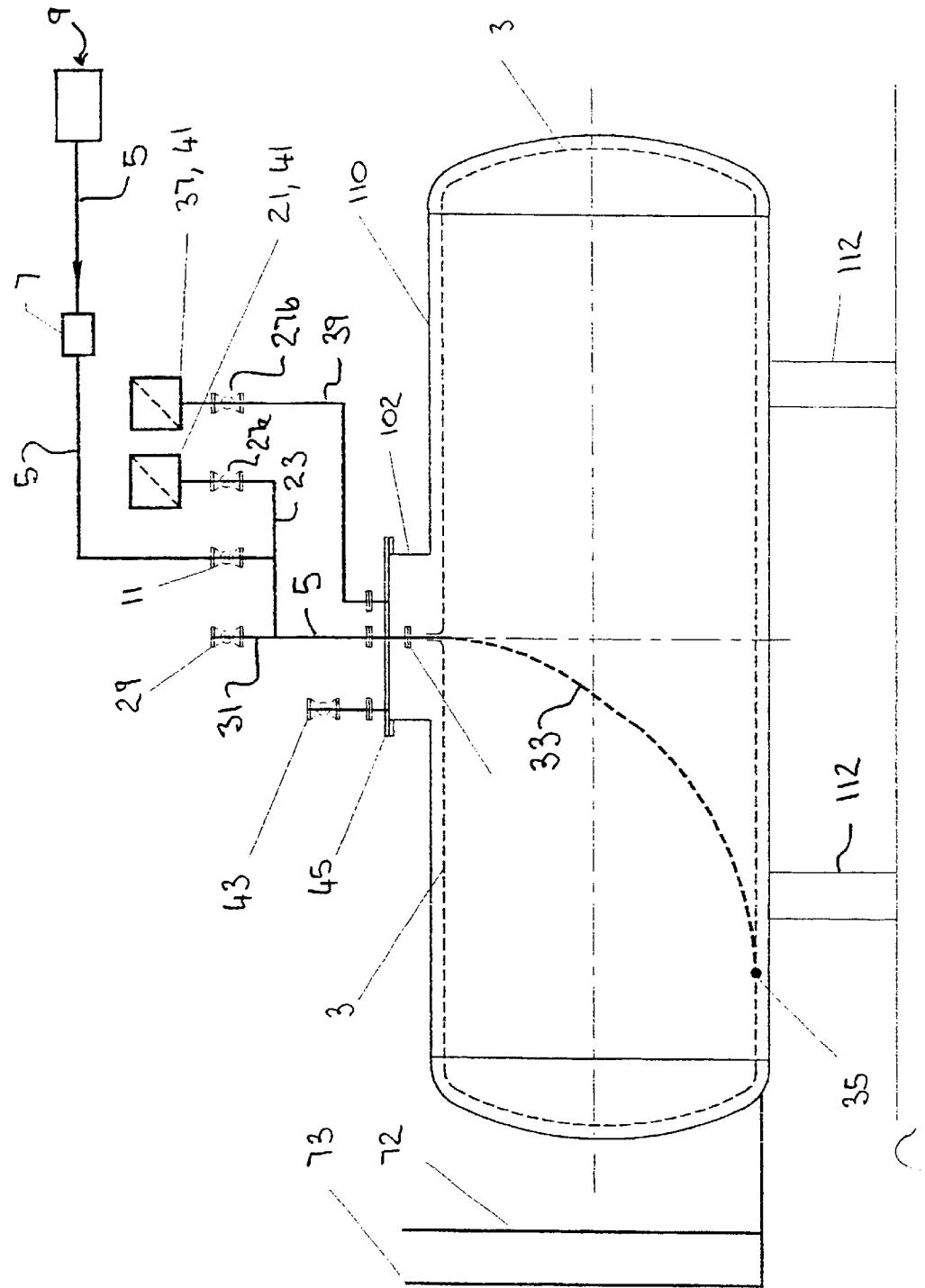
FIG. 6 is a vertical cross-sectional view of a second embodiment of the apparatus in accordance with an aspect of the present invention in use with an aboveground horizontal cylindrical tank having a single manhole.

FIG. 6 shows an apparatus 70 in accordance with the present invention installed in use with an aboveground tank 110. The tank 110 rests upon supports 112 above the ground 114.

The apparatus 70 shown in FIG. 6 is similar to the apparatus 1 of the first embodiment except that the shroud 59 is omitted and only a single bladder 3 is provided. The filling and discharging of the tank 110 is done via the inlet-outlet line 72.

The level of liquid in the container 110 and sampling thereof is done by the level and sampling line 73.

Figure 7:
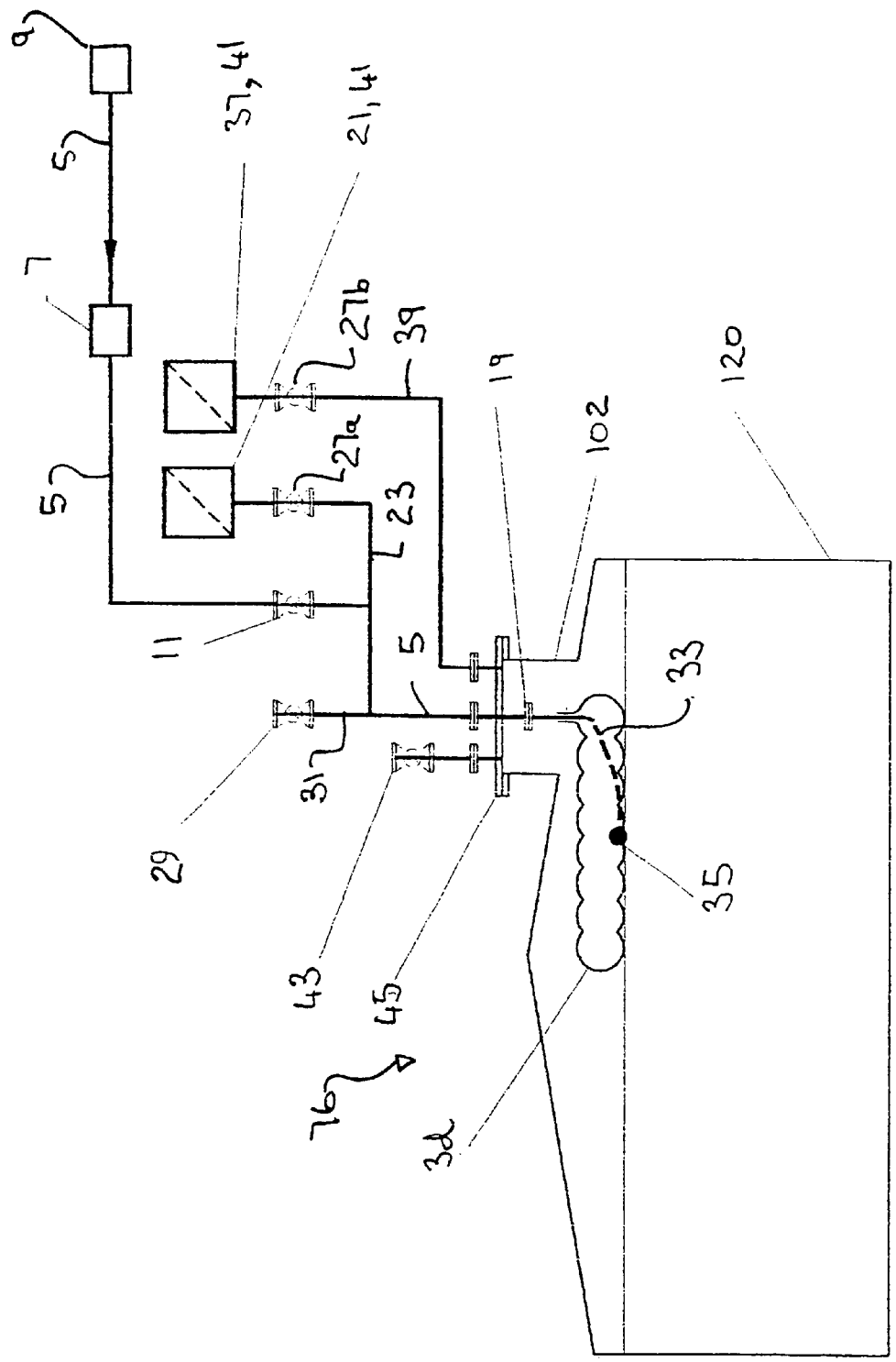
FIG. 7 is a vertical cross sectional view of a third embodiment of an apparatus in accordance with an aspect of the present invention in use with a long term storage vertical cylindrical tank.

FIG. 7 shows the installation of an apparatus 76, in accordance with the present invention, in a long term storage tank 120. The apparatus 76 is similar to the apparatus 70, shown in FIG. 6, except that the bladder 3d has a relatively small capacity relative to the volume of the storage tank 120 and that the bladder 3d begins to operate only when the tank 120 has been filled.

Since the tank 120 is a long term storage tank, the level of the liquid contained therein does not rise and fall. Instead, the container 120 is maintained in a condition where it is filled with the liquid. Thus, the bladder 3d is required to only fill the space above the liquid once the container 120 has been filled with the liquid.

Figure 8:
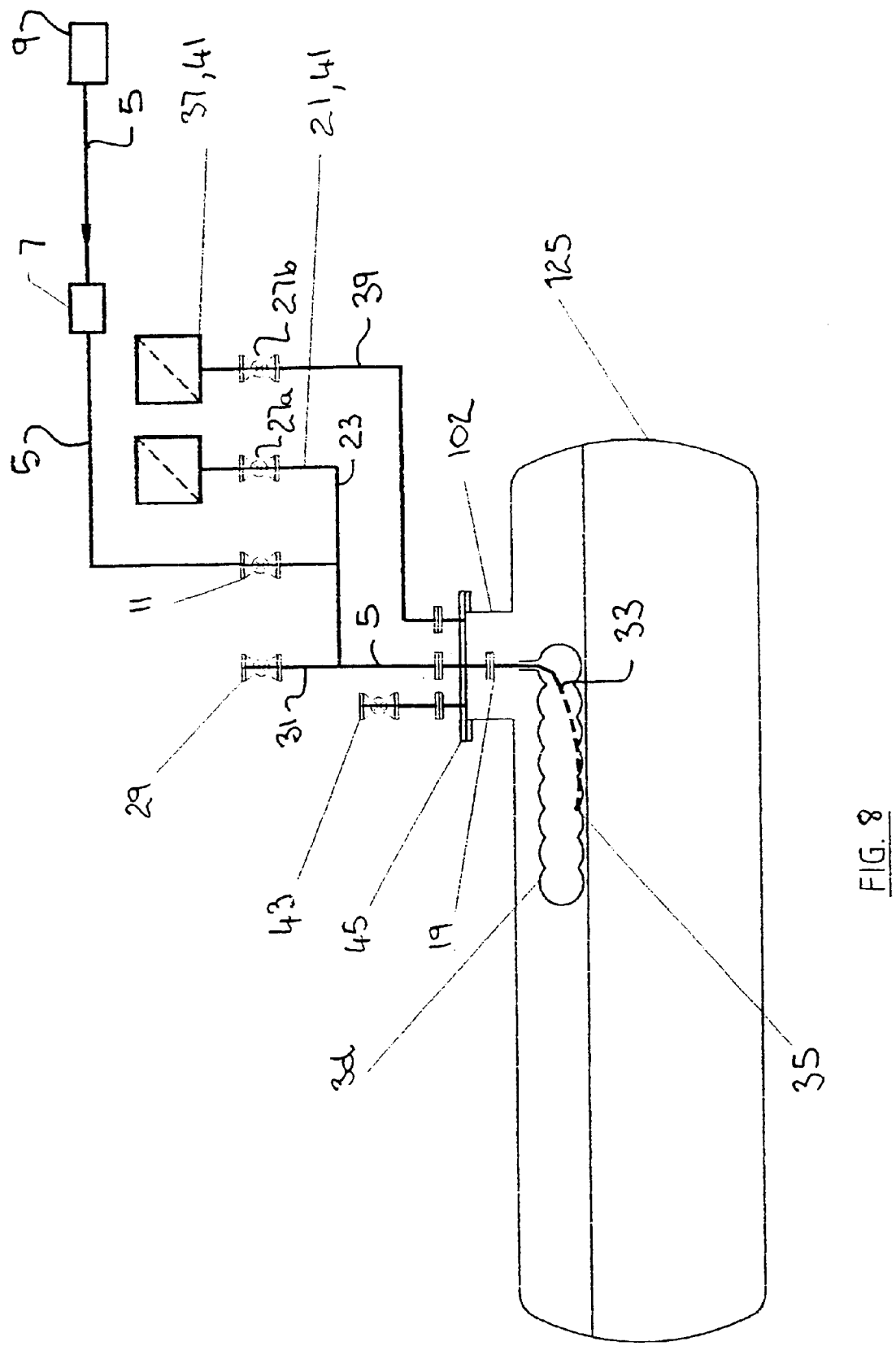
FIG. 8 shows the third embodiment of the apparatus shown in FIG. 7, in use with a long term storage horizontal cylindrical tank.

FIG. 8 shows the apparatus 76 installed in a tank 125. The only difference between the arrangement shown in FIG. 7 and FIG. 8 is that in FIG. 8 the tank 125 has a different shape. The tank 125 is substantially a horizontal cylindrical tank.

Figure 9:
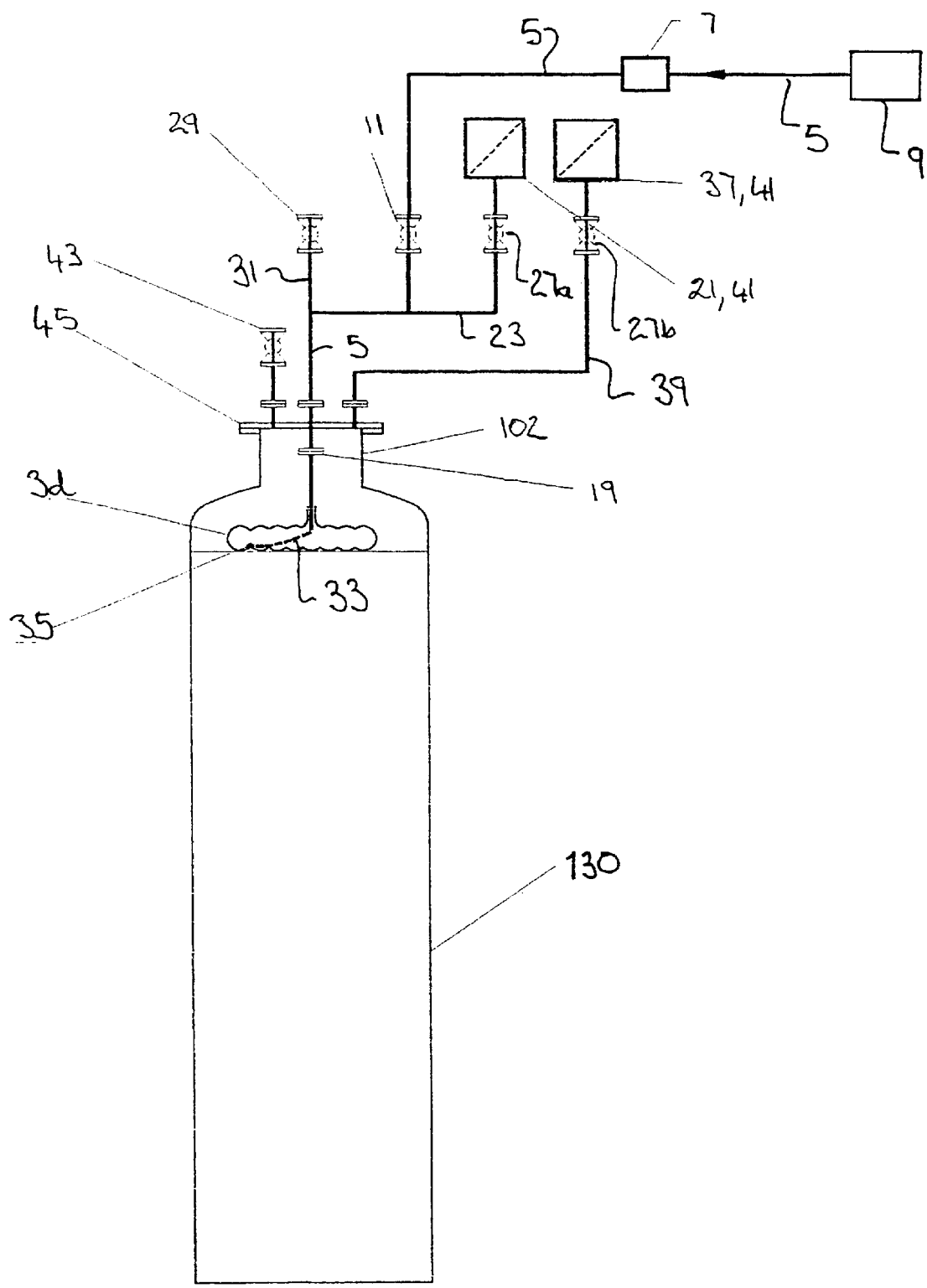
FIG. 9 shows the third embodiment of the apparatus shown in FIG. 7, in use with a long term storage cigar-shaped tank.

FIG. 9 shows the installation of the apparatus 76 in a tank 130. The only difference between the arrangements shown in FIGS. 7 and 9 is that in FIG. 9, the tank 130 has a different shape. The tank 130 is a vertical cigar-shaped tank.

Figure 10:
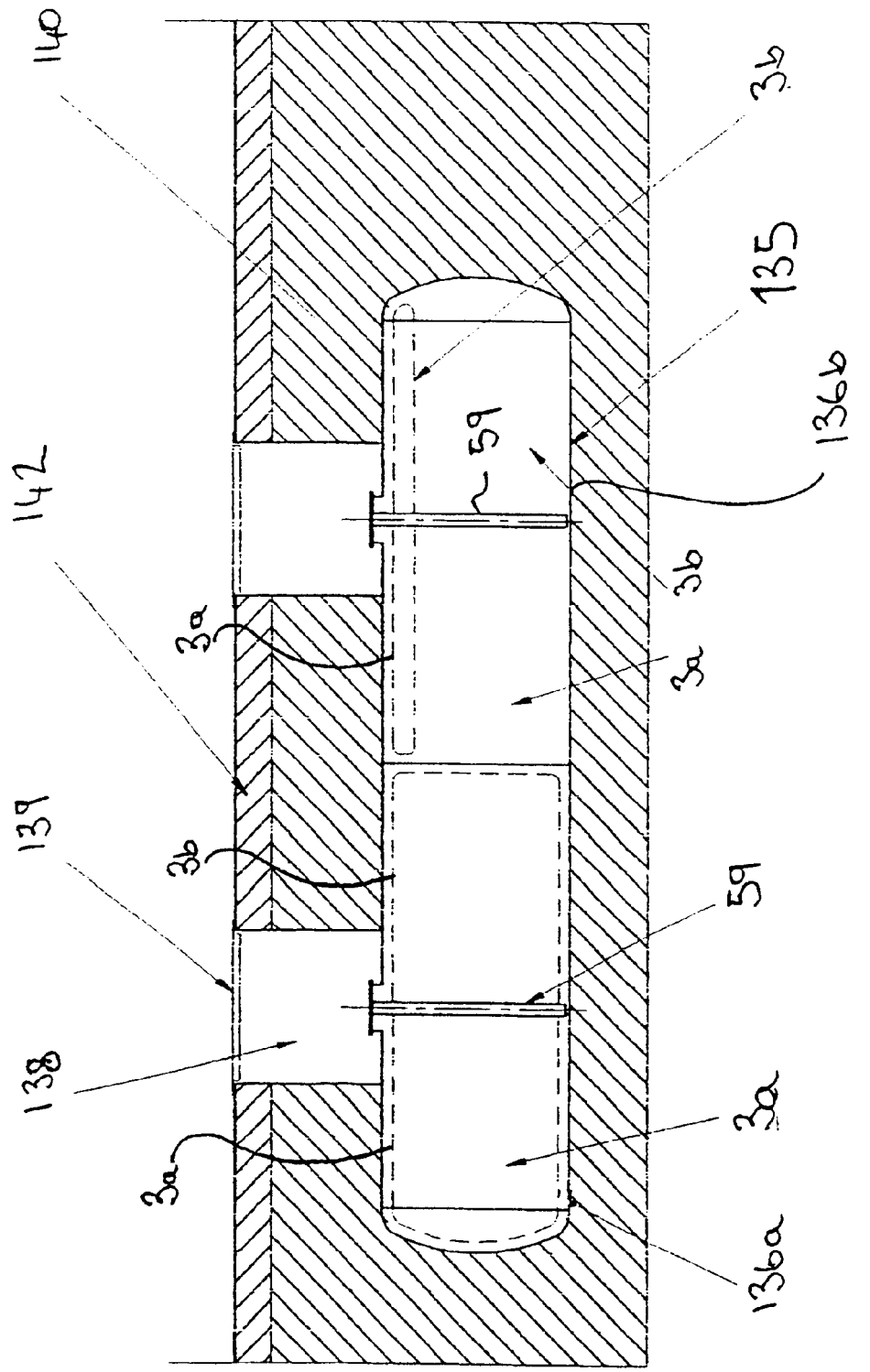
FIG. 10 is a schematic illustration of a below ground tank divided into two separate containers having bladders of the apparatus of the present invention installed therein.

FIG. 10 shows an underground fuel storage tank 135 divided into two separate container sections 136a and 136b.

Each container 136a and 136b may employ an apparatus 1 as previously hereinbefore described with reference to FIGS. 1–5.

In FIG. 10, the container 136a is shown as being empty, as can be seen by the bladders 3a and 3b being inflated. In contrast, the container 136b is shown as being substantially filled with liquid, as can be seen by the relatively small inflated volume of the bladders 3a and 3b in the container 136b.

FIG. 10 also illustrates the underground installation of the tank 135. The access pits 138 for the manholes 102 are illustrated. Cover plates 139 are provided to cover the access pits 138.

Backfilling of the tank 135 is done by sand 140. A concrete layer 142 is provided at ground level above the tank 135.

Figure 11:
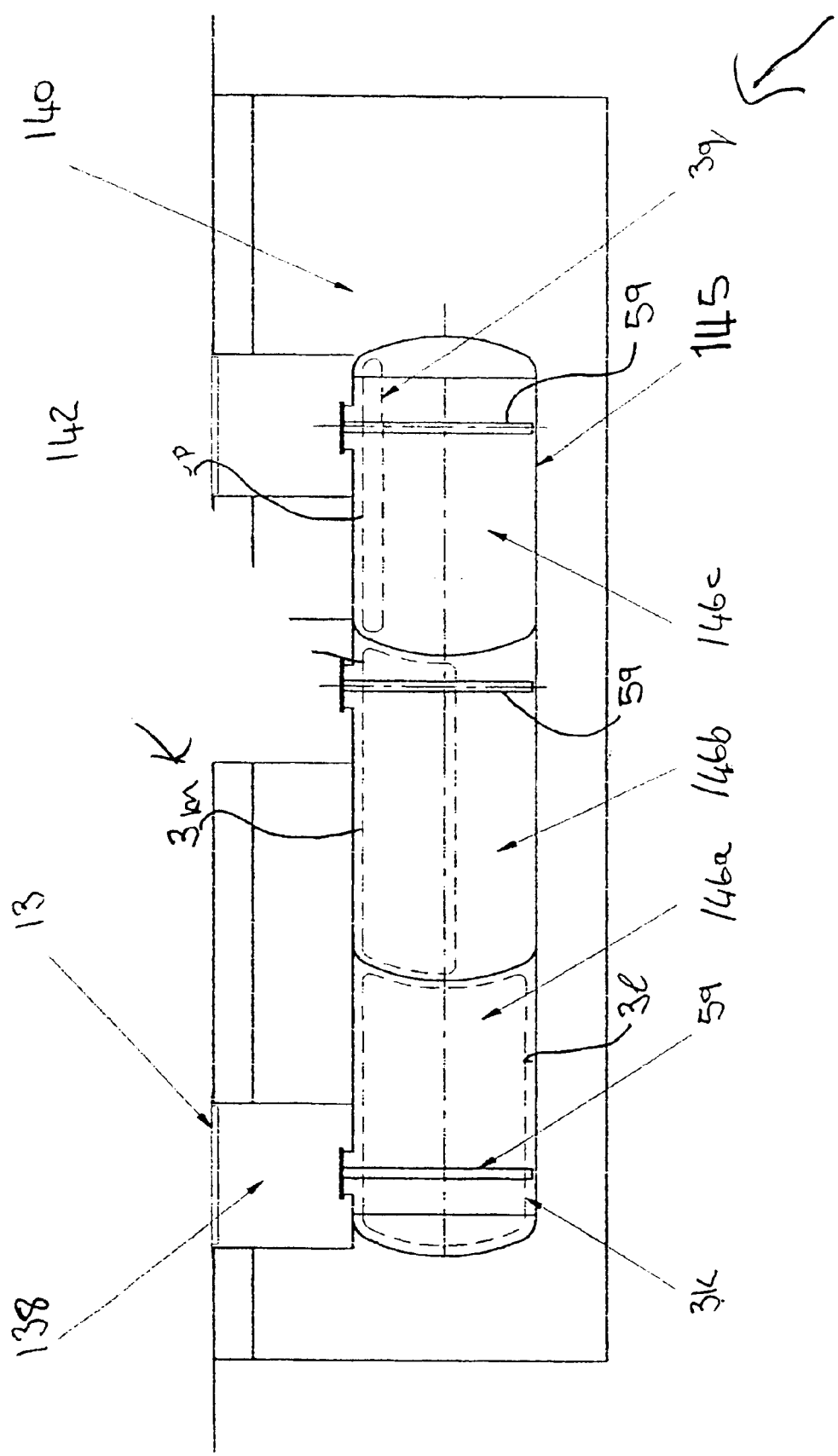
FIG. 11 is a schematic illustration of a below ground tank divided into three separate container sections having bladders of the apparatus of the present invention installed therein.

FIG. 11 shows an underground tank 145 divided into three separate container sections 146a, 146b and 146c.

The arrangement shown in FIG. 11 is similar to that shown in FIG. 10, except that the tank 145 is provided with a third container and that the sizes of the bladders 3k, 3l, 3m, 3n, 3p, and 3q in the containers 146a, 146b and 146c are not the same. This is due to the positioning of the manholes 102 relative to the length of the respective container sections 146a, 146b and 146c.

Figure 12:
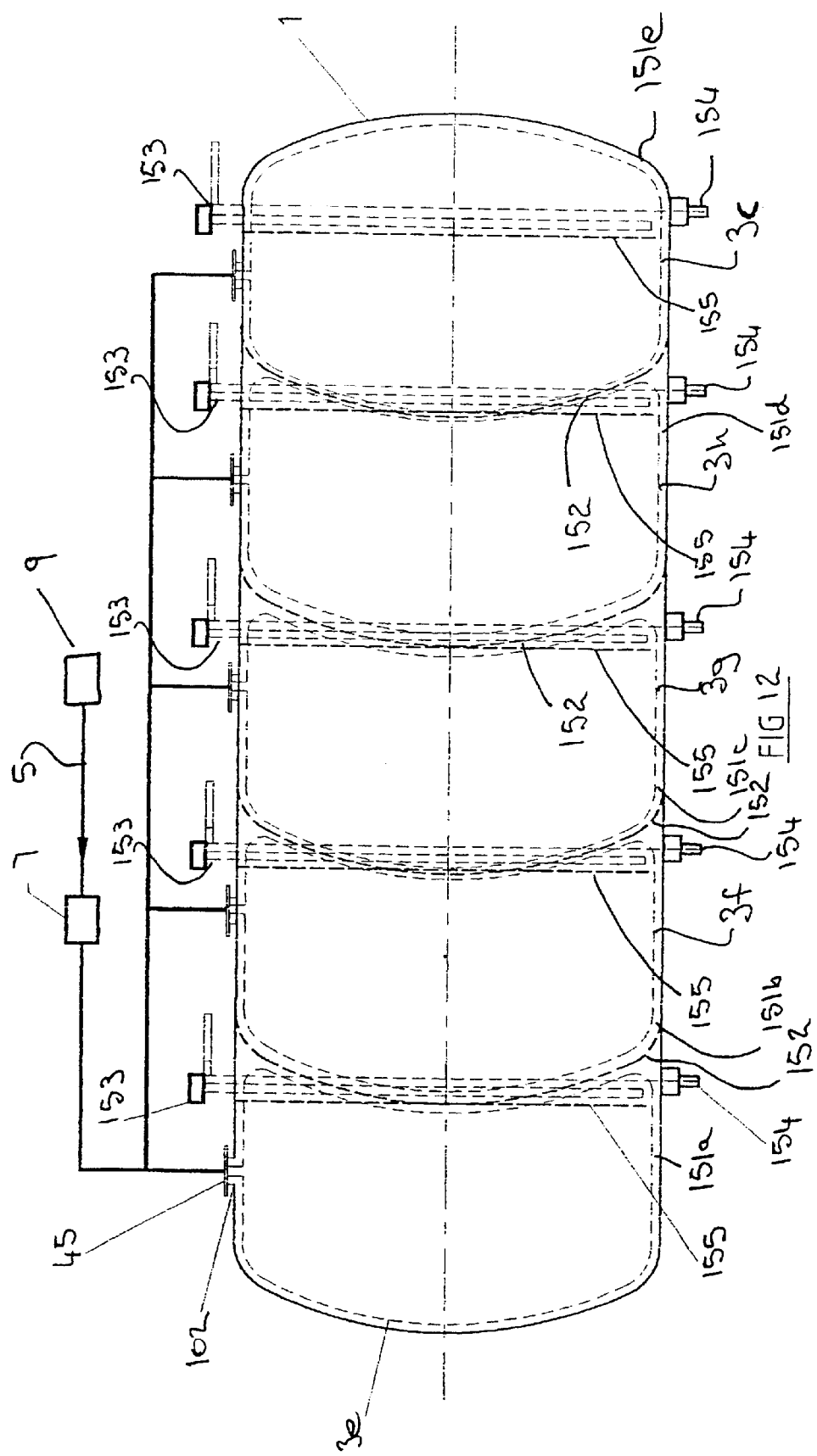
FIG. 12 is a schematic illustration of the storage tank of a fuel transporting tanker truck, in which the tank is divided into separate container sections having bladders of the apparatus of the present invention installed therein.

FIG. 12 shows the tank 150 of a fuel transporting truck. The tank 150 is provided with several separate containers 151a, 151b, 151c, 151d and 151e. Adjacent containers 151a–151e are separated by internal walls 152.

The filling pipes 153 and suction nozzles 154 of each container 151a–151e are also shown in FIG. 12.

Given that the storage tanks of fuel transporting trucks are frequently fuelled and discharged, the use of the apparatus of the present invention in such tanks would be effective in reducing the amount of fuel lost due to evaporation of the fuel. The filling pipes 153 are surrounded by shrouds 155 to protect the bladders 3e, 3f, 3g, 3h and 3i from damage.

Figure 13:
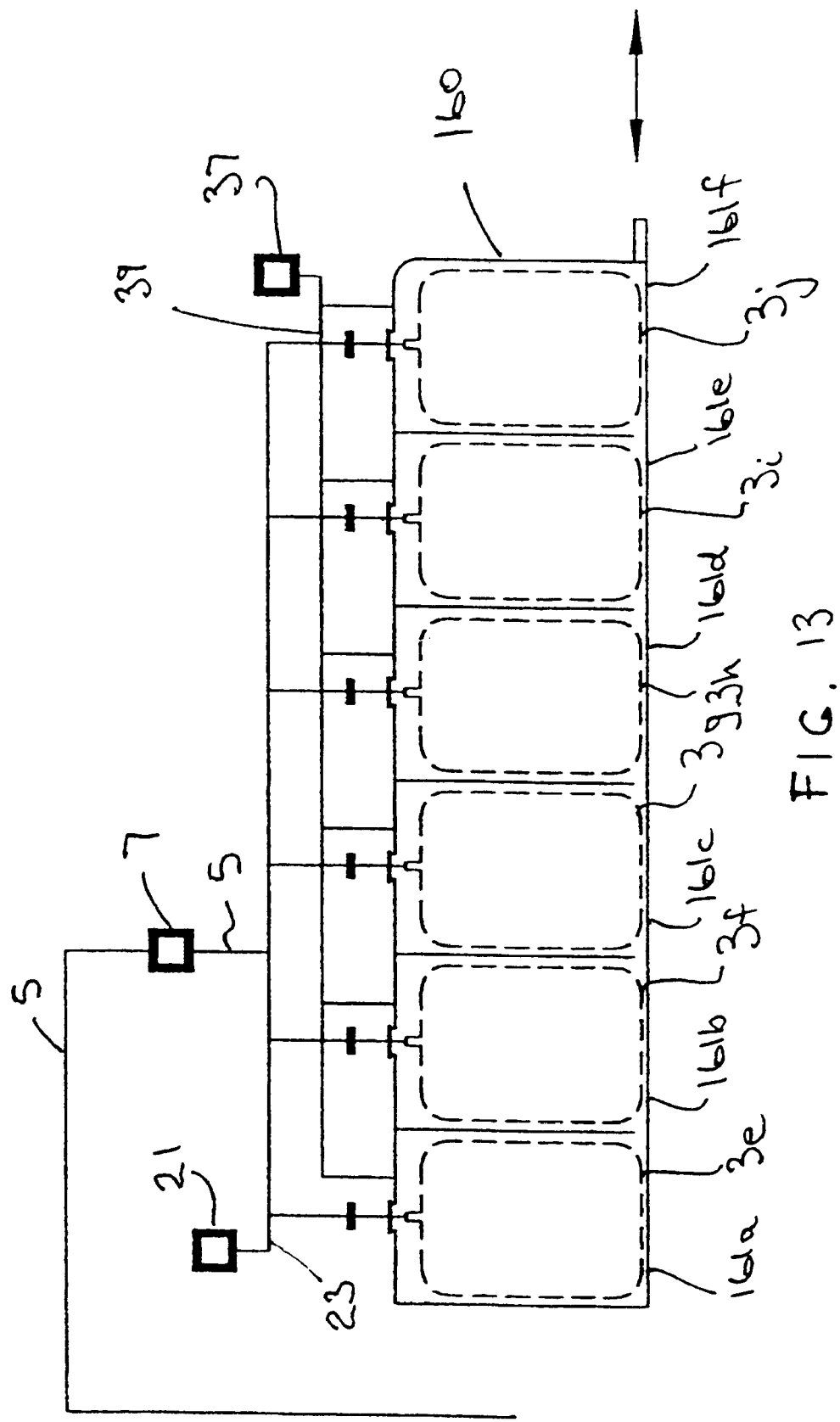
FIG. 13 is a schematic illustration of a fuel storing tank of an aircraft divided into separate container sections having bladders of the apparatus of the present invention installed therein.

Each of the containers 151a–151e is connected with pressure relief valves 11 and 12 (not shown) in similar manner to the apparatus 1 shown in FIGS. 1–5. FIG. 13 shows an aircraft fuel storage tank 160 in which the apparatus of the present invention has been installed. The fuel tank 160 is divided into separate containers 161a–161f. In other respects, the arrangement shown in FIG. 13 is analogous to that shown and described with reference to FIGS. 1–5 and FIG. 12.

Aircraft may reach altitudes of 8–10 kilometers in only a few minutes after take off. At these altitudes, the outside temperature may be in the range of –50° C. to –60° C. At this temperature, the pressure is significantly reduced compared with that at the earth's surface. Under these conditions, the use of the present invention is particularly advantageous. The inflated bladders 3e–3j ensure that the fuel is sealed from contact with the ambient air. This prevents ambient air being drawn into the containers 161a–161f. In addition, the inflated bladders 3e–3j ensure that vapor pressures are not created within the containers 161a–161f.

Investigations of aircraft crashes have indicated that fires may be caused by the fuel vapor in the aircraft fuel tank igniting. This may occur even though the aircraft has dumped fuel since a significant amount of fuel vapor may nevertheless remain in the fuel tanks. It appears that when the empty fuel tanks are overheated at low atmospheric pressures, the heated fuel vapors jet out through the breathing valves of the fuel tank and are sparked by static charges causing an explosion. However, use of the apparatus in accordance with the present invention in fuel tanks prevent escape of flammable fuel vapors.

Throughout the specification, unless the context requires otherwise, the word "comprise" or variations such as "comprises" or "comprising", will be understood to imply the inclusion of a stated integer or group of integers but not the exclusion of any other integer or group of integers.

Modifications and variations such as would be apparent to a skilled addressee are deemed to be within the scope of the present invention.

What is claimed is:

1. Apparatus for use with a container for storing a substance comprising:
   bladder means arranged to be located in the container above the substance stored therein,
   pipe means to deliver inflation medium to said bladder means,
   pressure control means to supply inflation medium to said bladder means via said pipe means,
   first pressure relief means to allow escape of inflation medium from said bladder means to relieve pressure from said bladder means, said first pressure relief means is set to a first selected pressure that is higher than the vapor pressure of the substance in the container, and
   second pressure relief means to allow escape of vapor of the substance from the container to relieve pressure from the container, said second pressure relief means is set to a second selected pressure that is higher than said first selected pressure,
   wherein said pressure control means is arranged to control supply of inflation medium to said bladder means to maintain the pressure in said bladder means above the vapor pressure of the substance in the container and said bladder means substantially fills the space above the substance in said container, said first pressure relief means is arranged to relieve pressure build-up in said bladder means to maintain the pressure in said bladder means at or below said first selected pressure, and said second pressure relief means is arranged to relieve pressure build-up in the container to maintain the pressure in the container at or below said second selected pressure.

2. Apparatus according to claim 1, further comprising sensor means to measure at least one parameter indicative of the vapor pressure of the substance in the container.

3. Apparatus according to claim 2, wherein said sensor means comprises a pressure gauge.

4. Apparatus according to claim 2, wherein said sensor means comprises a temperature gauge.

5. Apparatus according to claim 1, wherein said first selected pressure is up to substantially 5% higher than the vapor pressure of the substance in the container such that the pressure in said bladder means is maintained at a level up to substantially 5% higher than the vapor pressure of the substance in the container.

6. Apparatus according to claim 1, characterised in that said bladder means is provided with pressure relief valve means to maintain said pressure in said bladder means at or below a second selected pressure.

7. Apparatus according to claim 6, characterised in that isolation valve means is provided to control escape of inflation medium from said bladder means via said pressure relief valve means when required.

8. Apparatus according to claim 1, wherein access means is provided to access the interior of said bladder means.

9. Apparatus according to claim 1, wherein pressure relief valve means is provided to enable escape of vapor from said container.

10. Apparatus according to claim 1, wherein inlet means is provided to enable said container to be purged of air with a gas during installation of said bladder means into said container.

11. Apparatus according to claim 1, wherein the volume of said bladder means when inflated in substantially the same as the volume of said container.

12. Apparatus according to claim 1, wherein the volume of said bladder means when inflated is substantially the same as the space remaining in said container when said container is filled with liquid.

13. Apparatus according to claim 1, wherein a cover is provided to close off an opening of said container, said cover provided with fittings to which said bladder means is attachable.

14. Apparatus according to claim 13, wherein said cover is provided with shroud means extending therefrom and arranged to be positioned within said container, said shroud means housing equipment located in said container.

15. Apparatus according to claim 14, wherein said shroud means is provided with vent openings in an upper region thereof.

16. Apparatus according to claim 14, wherein said shroud means comprises a tube attached at one of its ends to said cover.

17. Apparatus according to claim 1, wherein said bladder means comprises one or more individual bladders.

18. Apparatus according to claim 1, wherein the inflation medium comprises air.

19. Apparatus according to claim 1, wherein the inflation medium comprises gas.

20. Apparatus according to claim 1, wherein the inflation medium comprises liquid.

21. Apparatus according to claim 1, characterised in that sensor means is provided to measure at least one parameter indicative of the vapor pressure of said substance in said container, and said pressure control means arranged to supply inflation medium to said bladder means to maintain the pressure in said bladder means at or above the vapor pressure measured by said gauge means.

22. Apparatus according to claim 1, further comprising means to selectively close off said bladder means from said first pressure relief means to prevent escape of inflation medium from said bladder means via said first pressure relief means and thereby prevent pressure relief from said bladder means via said first pressure relief means when required.

23. Apparatus according to claim 22, wherein said means to selectively close off said bladder means from said first pressure relief means comprises an isolation valve.

24. Apparatus according to claim 1, further comprising means to selectively close off the container from said second pressure relief means to prevent escape of vapour of the substance from the container via said second pressure relief means and thereby prevent pressure relief from the container via said second pressure relief means when required.

25. Apparatus according to claim 24, wherein said means to selectively close off the container from said second pressure relief means comprises a first isolation valve.

26. Apparatus according to claim 1, wherein the substance in the container comprises a liquid.

27. Apparatus according to claim 1, when said second selected pressure is up to substantially 20% higher than the vapor pressure of the substance in the container.

28. A method for use with a container for storing a substance comprising:

installing bladder means into the container, delivering inflation medium to said bladder means, controlling the supply of the inflation medium to said bladder means to maintain the pressure in said bladder means above the vapor pressure of the substance in the container, allowing escape of inflation medium from said bladder means to relieve pressure build-up in said bladder means to maintain the pressure in said bladder means at or below a first selected pressure, said first selected pressure being higher than the vapor pressure of the substance in the container, allowing escape of vapor of the substance stored in the container to relieve pressure build-up in the container to maintain the pressure in the container at or below a second selected pressure, said second selected pressure being higher than said first selected pressure, and maintaining said bladder means in an inflated condition to substantially fill the space above the substance in the container.

29. A method according to claim 28, wherein it further comprises maintaining the pressure in said bladder means at a level up to substantially 5% higher than the vapor pressure of said substance.

30. A method according to claim 28, wherein said second selected pressure is substantially at least 5% higher than the vapor pressure of said substance.

31. A method according to claim 28, wherein the inflation medium comprises air.

32. A method according to claim 28, wherein the inflation medium comprises gas.

33. A method according to claim 28, wherein the inflation medium comprises liquid.

34. A method according to claim 28, wherein said first selected pressure is up to substantially 5% higher than the vapor pressure of the substance in the container and the method further comprises maintaining the pressure in said bladder means at a level up to substantially 5% higher than the vapor pressure of the substance in the container.

35. A method according to claim 28, wherein said second selected pressure is up to substantially 20% higher than the vapor pressure of the substance in the container.

* * * * *